Nov. 24, 1970   R. H. PFIFFNER   3,542,630
COLOR CHANGEABLE EMBOSSABLE SHEET MATERIAL
Filed March 12, 1965   3 Sheets-Sheet 1
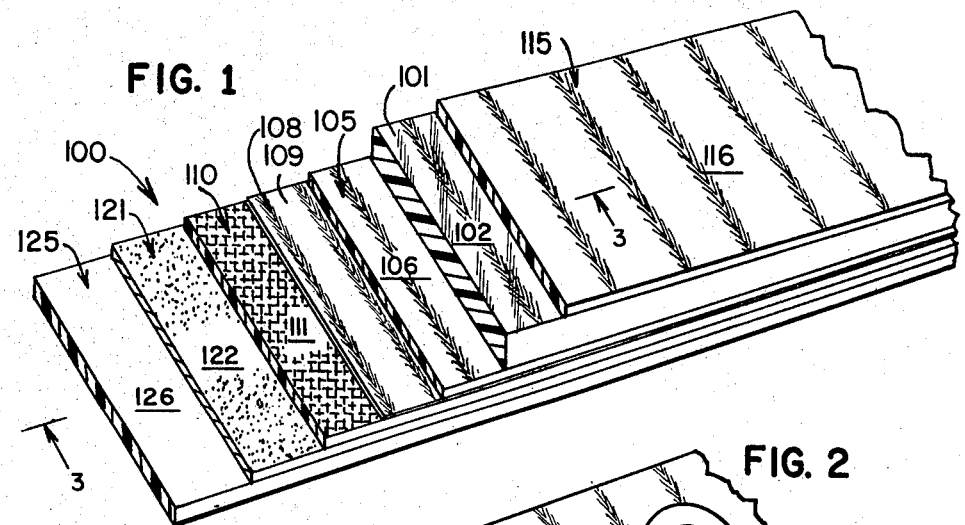
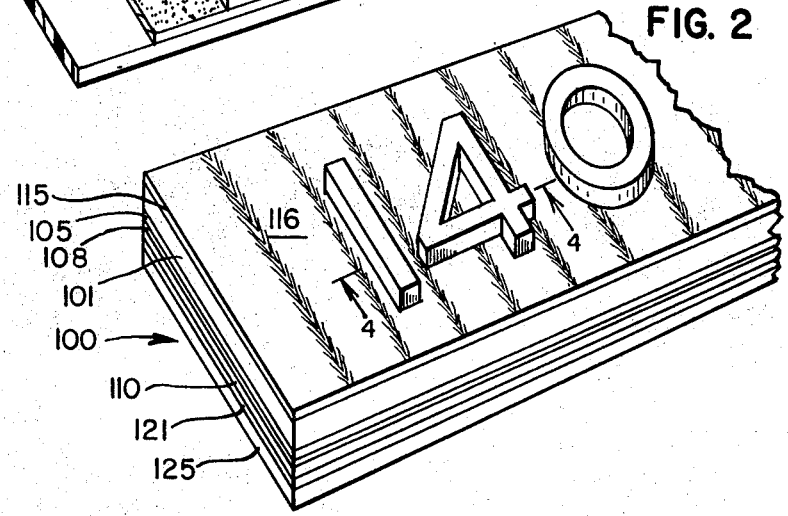
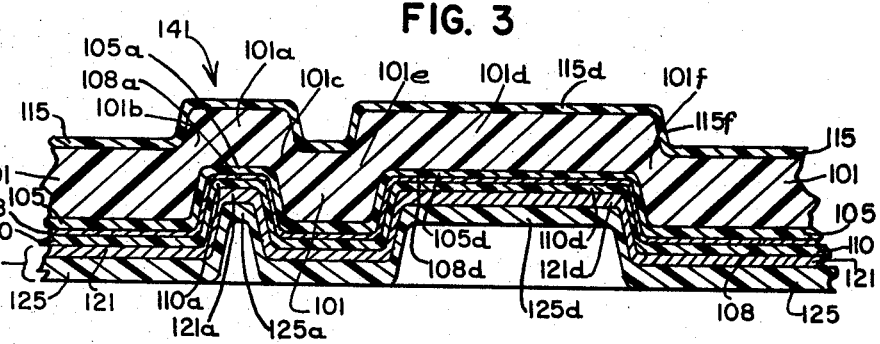
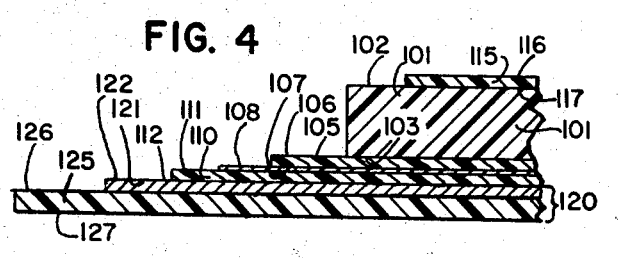
Inventor
ROBERT H. PFIFFNER
BY Brangley, Baird,
Clayton, Miller & Vogel.
ATTYS.

Nov. 24, 1970  R. H. PFIFFNER  3,542,630
COLOR CHANGEABLE EMBOSSABLE SHEET MATERIAL
Filed March 12, 1965  3 Sheets-Sheet 2
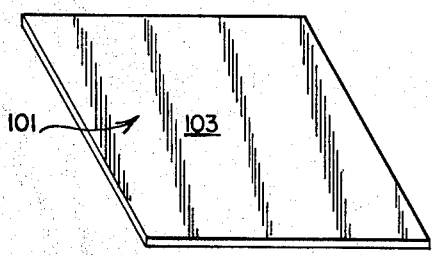
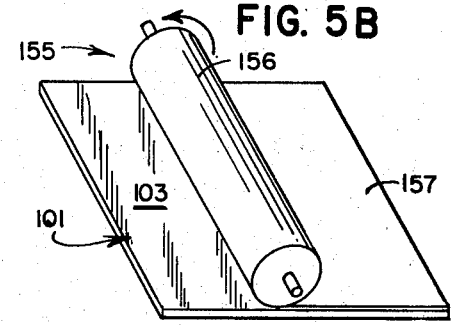
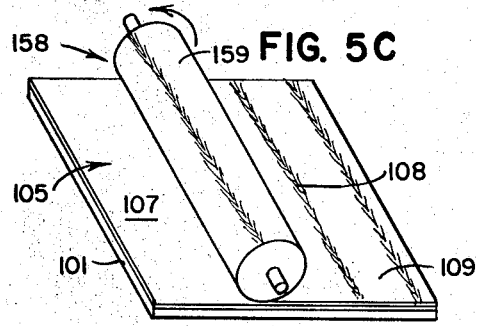
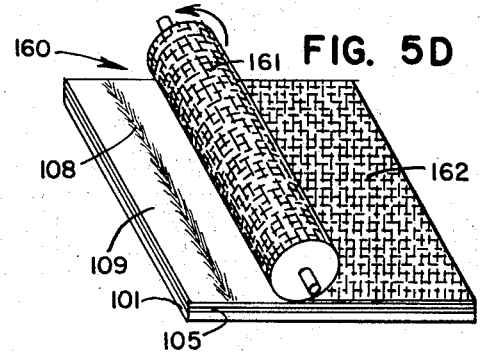
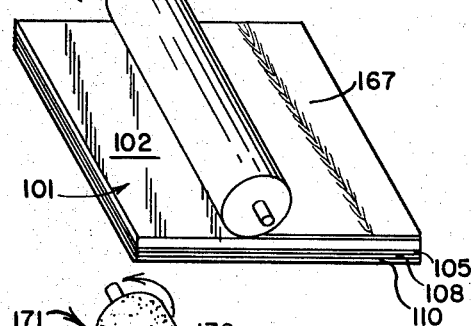
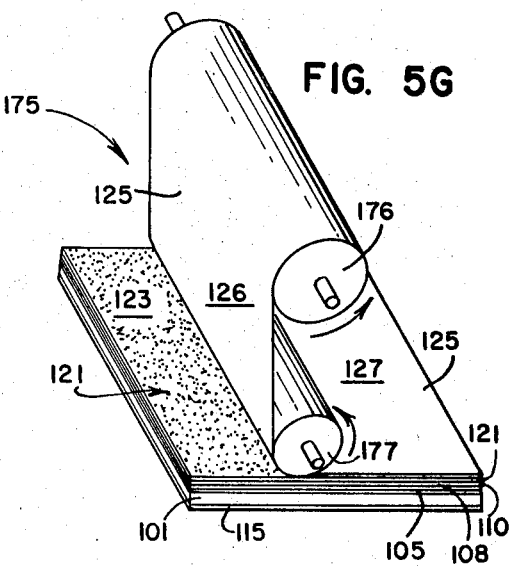
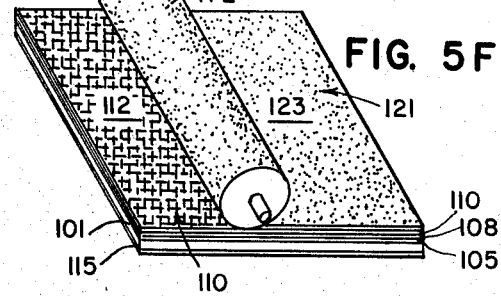
Inventor
ROBERT H. PFIFFNER
BY
Prangley, Baird, Clayton, Miller & Vogel
ATTYS.

Nov. 24, 1970     R. H. PFIFFNER     3,542,630
COLOR CHANGEABLE EMBOSSABLE SHEET MATERIAL
Filed March 12, 1965     3 Sheets-Sheet 3
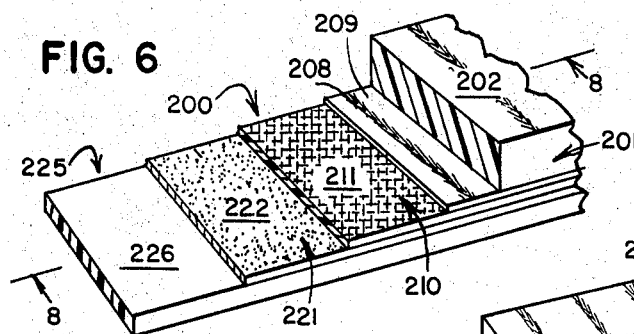
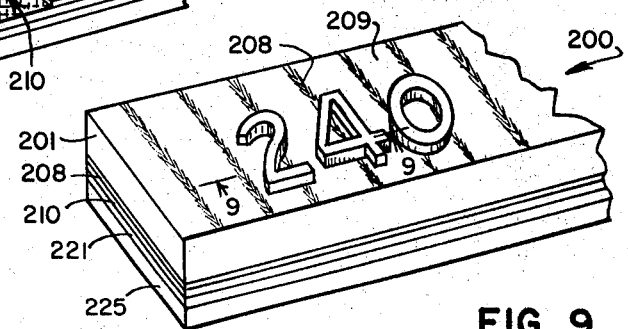
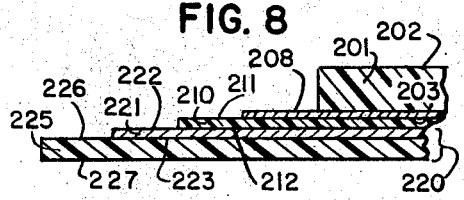
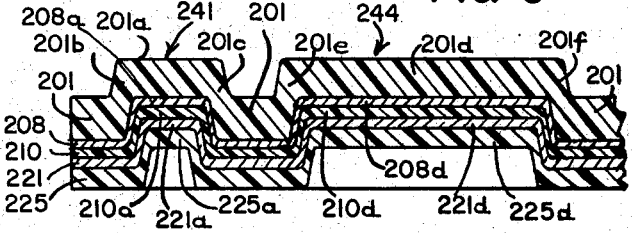
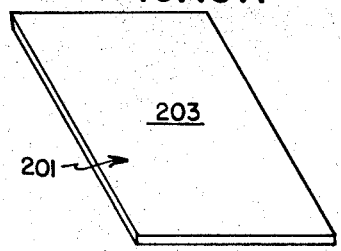
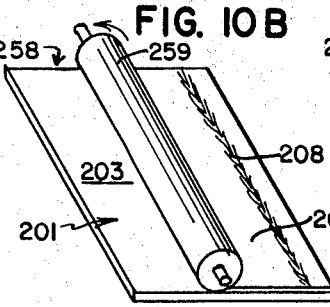
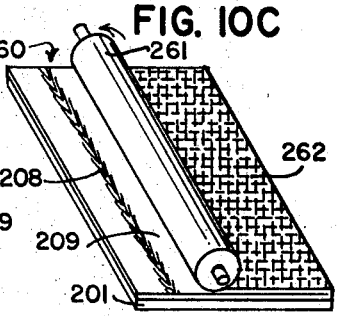
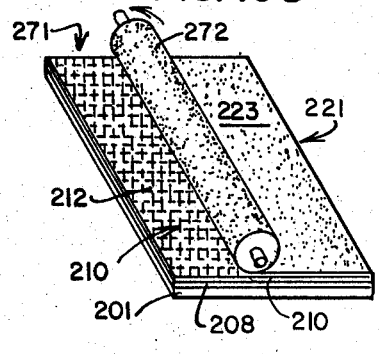
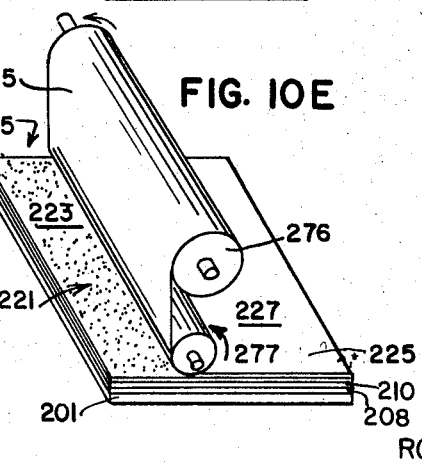
Inventor
ROBERT H. PFIFFNER
BY
Prangley, Baird, Clayton, Miller & Vogel
ATTYS.

United States Patent Office 3,542,630
Patented Nov. 24, 1970

3,542,630
COLOR CHANGEABLE EMBOSSABLE SHEET
MATERIAL
Robert H. Pfiffner, Oakland, Calif., assignor to Dymo
Industries, Inc., Berkeley, Calif., a corporation of California
Filed Mar. 12, 1965, Ser. No. 439,343
Int. Cl. B32b 7/06, 27/08; B44f 1/08
U.S. Cl. 161—6
5 Claims

ABSTRACT OF THE DISCLOSURE

There is disclosed an embossable sheet material including an embossable base sheet of plastic, a transparent top coat having a flatting agent therein on the front surface of the base sheet and a transparent primer coating having a flatting agent therein on the back surface thereof, an open pattern of a first color on the back surface of the primer coat and a layer of plastic of a second color bonded to the back surface of the primer coat, the open pattern and the color in the plastic providing a pattern visible through the base sheet and the top coat and the primer coat, a layer of pressure sensitive adhesive on the rear surface of the colored plastic layer, and a backing sheet covering the exposed surface of the adhesive.

---

This invention relates to embossable sheet material, and specifically an embossable type.

It is an important object of the present invention to provide an improved embossable sheet material of the type including a base sheet formed of a transparent rigid synthetic organic resin having a structure and composition such that permanent cold flow deformation thereof to form embossments thereon renders the resin opaque in the areas of deformation of the embossments, the base sheet carrying on the back surface thereof a decorative design of two contrasting colors, and specifically a wood grained design, whereby the sheet material is embossable to provide opaque embossments on a field of decorative design when viewed through the front surface of the base sheet.

Another object of the invention is to provide an improved embossable sheet material of the type set forth wherein the transparent base sheet has an open pattern of a relatively dark color printed on the back surface thereof and an opaque layer of synthetic organic resin carrying a relatively light colored pigment disposed on the back surface thereof and overlying the open pattern and visible through the openings in the pattern and through the base sheet, the open pattern and the opaque layer cooperating to form a decorative design such as a wood grained design visible throughout the area of the base sheet when viewed through the front surface thereof.

Yet another object of the invention is to provide an embossable sheet material of the type set forth wherein a primer coat having a flatting agent uniformly distributed therethrough is applied to the back surface of the base sheet before the application of the decorative design thereto so as to improve the adherence of the decorative design to the base sheet.

Still another object of the invention is to provide an improved embossable sheet material of the type set forth wherein a transparent top coat is applied to the front surface of the base sheet to provide a matte or dull finish thereon so that when the decorative design on the back surface of the base sheet is a wood grained design, the appearance of the finished sheet material is that of hand-rubbed wood.

In connection with the foregoing object, it is another object of the invention to provide an improved embossable sheet material of the type set forth wherein the top coat also carries an ultraviolet screening agent to protect the sheet material from deterioration where exposed to sunlight and ultraviolet light and an anti-static agent to reduce the build-up of electrical charges thereon during use thereof.

A further object of the invention is to provide improved embossable sheet materials of the type set forth carrying on the back surface thereof a layer of pressure sensitive adhesive and an overlying detachable protective backing sheet removably adhered to the exposed surface of the adhesive layer, whereby the embossable sheet material can be adhesively adhered to an underlying support surface upon removal of the backing sheet therefrom.

Further features of the invention pertain to the particular arrangement of the component parts of the embossable sheet material and to the particular arrangement of the steps of the methods whereby the above-outlined and additional operating features thereof are attained.

The invention, both as to its organization and method of operation, together with further objects and advantages thereof, will best be understood by reference to the following specification taken in connection with the accompanying drawings, in which:

FIG. 1 is a perspective view on an enlarged scale of a short length of a piece of embossable sheet material in the form of a tape constructed in accordance with and embodying the principles of the present invention, the various layers of the tape being cut away to the right to illustrate the construction thereof;

FIG. 2 is a perspective view on an enlarged scale of a short length of a piece of the tape illustrated in FIG. 1 and showing characters embossed on the front surface thereof;

FIG. 3 is a further enlarged view in longitudinal section through the tape of FIG. 1 along the line 3—3 thereof;

FIG. 4 is a further enlarged view in longitudinal section through the tape of FIG. 2 along the line 4—4 thereof;

FIGS. 5A through 5G diagrammatically illustrate the method of making the embossable tape of FIG. 1;

FIG. 6 is a view similar to FIG. 1 and illustrating a modified form of the embossable tape;

FIG. 7 is a perspective view similar to FIG. 2 of the modified form of the tape illustrated in FIG. 6 showing characters embossed on the front surface thereof;

FIG. 8 is a further enlarged view in longitudinal section through the embossable tape of FIG. 6 along the line 8—8 thereof;

FIG. 9 is a further enlarged view in longitudinal section through the embossed tape of FIG. 7 along the line 9—9 thereof; and FIGS. 10A through 10E diagrammatically illustrate the method of making the embossable tape of FIG. 6.

Referring to FIGS. 1 and 3 of the drawings, there is illustrated an embossable sheet material 100 made in accordance and embodying the principles of the present invention, the embossable sheet material 100 being in the form of an elongated embossable tape, and accordingly, the embossable sheet material 100 will hereinafter be referred to as an embossable tape. As illustrated, the embossable tape 100 includes a base sheet 101 of a synthetic organic resin, the synthetic organic resin being transparent and rigid, as distinguished from rubber-like, and having a structure and composition such that permanent cold flow deformation thereof to form embossments thereon renders opaque the original transparent resin in the areas of deformation of the embossments.

More particularly, the material of the base sheet 101 is of the type which can be readily hand embossed to form opaque indicia or characters in the form of raised embossments on the front surface thereof disposed on a field of the transparent synthetic organic resin by means of a hand-operated embossing device of the type disclosed in United States Letters Patent No. 3,083,807 granted Apr. 2, 1963 to Dalny Travaglio. Such indicia are useful for the purpose of identification or otherwise imparting information to the viewer, the utility thereof being enhanced by the fact that the embossments are substantially opaque whereas the unembossed base sheet 101 is still transparent, whereby to provide a marked contrast therebetween. The synthetic organic resin of which is formed the base sheet 101 is of the so-called rigid or semi-rigid thermoplastic type for which the yield point occurs after a small amount of elongation and further elongation occurs with permanent deformation, i.e., cold flow deformation; resins with a substantial rubber-like type of elasticity are not suitable. The base sheet 101 must further be of the type which although rigid or semi-rigid can when in the form of a generally flat or continuous strip be coiled or wound without damage thereto. The preferred synthetic organic resin for forming the base sheet 101 are the rigid polyvinyl chloride polymers and the rigid polyvinyl chloride-polyvinyl acetate copolymers.

In accordance with the present invention, the base sheet 101 is in the form of an elongated tape having a front surface 102 and a back surface 103. Applied to the rear surface 103 is a decorative design which is formed of at least two contrasting colored areas visible through the transparent base sheet 101, the preferred decorative design and the one shown for purposes of illustration in the patent drawings being a simulated wood grained design which is visible through the base sheet 101 when viewed through the front surface 102 thereof. The decorative design is coterminus with the entire surface area of the base sheet 101, and accordingly, when opaque embossments are formed thereon, such as by using the hand tool of Patent No. 3,083,087 referred to above, an opaque or milky white embossment is provided on a field of simulated wood grained design, whereby to provide a highly decorative embossed tape.

In order to insure that the decorative design is adequately maintained on the back surface 103 of the tape 101, there is applied to the back surface 103 a primer coat 105 having a front surface 106 and a back surface 107, the front surface 106 being disposed against the back surface 103 of the base sheet 101. The primer coat 105 is also formed of a transparent synthetic organic resin of the same general character as the base sheet 101 and further carries a flatting agent which renders the back surface 107 thereof more receptive to the wood grained design that is the back surface 103 of the base sheet 101.

The wood grained pattern is applied directly to the back surface 107 of the primer coat 105 and includes an open pattern of a first darker color printed on the back surface 107 of the primer coat 105, the printed pattern being designated by the numeral 108 and corresponding to the darker portions of the simulated wood grained design, the printed pattern 108 having openings 109 therethrough corresponding to the lighter portions of the wood grained design. The light portion of the wood grained design is also applied to the back surface 107 of the primer coat 105 and overlies the printed pattern 108, the light portion of the design being in the form of a layer 110 of synthetic organic resin, the colored layer 110 having a front surface 111 and a back surface 112, the front surface 111 being adhered to the back surface 107 of the primer coat 105. The colored layer 110 has incorporated therein a relatively light colored pigment such as a yellow or yellow-orange pigment to represent the lighter portions of the wood grained design, and also is preferably opaque so that the printed pattern 108 is clearly seen thereagainst with the colored layer 110 showing through the openings 109 in the printed pattern 108. The printed pattern 108 and the opaque colored layer 110 accordingly cooperate to form a decorative design of the wood grained type visible throughout the area of the base sheet 101 when viewed through the front surface 102 thereof, it being noted that both the base sheet 101 and the primer coat 105 are transparent.

The front surface 102 of the base sheet 101 is normally shiny or glossy, whereby the wood grained pattern visible through the front surface 102 has an unreal appearance when the front surface 102 is in its normal shiny or glossy state. It is desirable to provide a nonglossy or matte or dull finish on the front surface 102 so as to give a more natural appearing wood grained finish to the embossable tape 100, it being desirable to provide what appears to be a hand-rubbed wood grained finish. To this end there is provided a top coat 115 formed of a transparent synthetic organic resin and having a front surface 116 and a back surface 117, the back surface 117 being adhered to the front surface 102 of the base sheet 101, the top coat 115 incorporating therein a flatting agent so as to impart to the base sheet 101 a dull matte finish, whereby when the wood grained design is viewed therethrough there is given the appearance of a hand-rubbed wood grained finish. There also may be preferably incorporated in the top coat 115 an ultraviolet screening agent to protect the embossable tape 100 from deterioration when exposed to sunlight and ultraviolet light falling thereon, and an anti-static agent to minimize the build-up of static electricity thereon during the use thereof.

In order to permit the embossable tape 100 to be readily applied to an underlying support surface for the labeling or identification function, an adhesive assembly 120 is provided on the back thereof, and specifically on the back surface 112 of the opaque colored layer 110. More specifically, there is applied to the back surface 112 of the layer 110 a pressure sensitive adhesive layer 121 having a front surface 122 and a back surface 123, the back surface 123 being securely adhered to the back surface 112 of the layer 110. Carried on the back surface 123 of the adhesive layer 121 is a backing sheet 125 including a front surface 126 and a back surface 127, the front surface 126 being detachably adhered to the back surface 123 of the adhesive layer 121, whereby the backing sheet 125 can be readily removed from the adhesive layer 121 without stripping the adhesive layer 121 from the back surface 112 of the layer 110. The backing sheet 125 serves to prevent blocking, i.e., sticking of the adjacent convolutions of the embossable tape 100 to each other, when the embossable tape 100 is wound into rolls or coils for storage purposes.

In the use of the embossable tape 100, a suitable tool such as the hand-operated embossing tool of Patent No. 3,083,807 referred to above may be utilized to emboss a desired letter, character or other indicia upon the tape 100, such as the indicia 140 illustrated in FIGS. 2 and 4 of the drawings. At least the base sheet 101 and in certain cases also the primer coat 105 and the top coat 115 are formed of a suitable transparent thermoplastic resin having a structure and composition such that permanent cold flow deformation thereof to form embossments such as the numeral "140" illustrated in FIG. 2 renders the resin opaque in the areas of such deformation. Referring specifically to FIG. 4, the embossment 141 to the left is formed by a cold flow deformation of at least the base sheet 101 to form a stressed opaque portion 101a flanked by stressed and deformed portions 101b and 101c that rise upwardly out of the unstressed and undeformed base sheet 101. The portions 101a, 101b and 101c are all opaque and milky white whereby the wood grained design therebeneath is not visible therethrough, whereas the wood grained design beneath the undeformed portions of the base sheet 101 on either side of the embossment 141 is clearly visible therethrough, whereby the embossment 141 is of an opaque milky white color and is positioned upon a field of wood grained design, thereby to produce a highly pleasing and decorative overall design.

The embossment 144 to the right in FIG. 4 also includes a stress whitened opaque and generally horizontally disposed portion 101d of the base sheet 101 and upwardly directed side portions 101e and 101f that are also opaque and extend upwardly out of the transparent unstressed portions of the base sheet 101. The opaque character of the stressed portions 101d and 101e and 101f render the embossment 144 opaque so that the wood grained pattern disposed therebelow is not visible therethrough while the wood grained pattern beneath the unstressed base sheet 101 on either side of the embossment 144 is clearly visible therethrough. As a result, the embossment 144 is of an opaque milky white color and is disposed on a field of wood grained design, whereby to provide a highly pleasing and decorative overall design. It will be understood that in the embossments 141 and 144, the other layers of the embossable tape 100 are likewise deformed and corresponding suffixes *a* through *f* have been applied to parts which underlie and overlie the corresponding lettered parts of the base sheet 101.

In order further to illustrate the present invention, further details of the composition of the various layers of the embossable tape 100 will be given and the method of making the embossable tape 100 will be further described with reference to FIGS. 5A through 5G of the drawings. Referring to FIG. 5A, there is diagrammatically illustrated the base sheet 101 with the glossy rear surface 103 disposed upwardly. The base sheet 101 is preferably formed of an unplasticized rigid polyvinyl chloride resin, particularly that sold under the trademark "Genotherm UG 200," which material is a mixture of two different vinyl chloride polymers, at least one of which is an emulsion polymer. The resin is processed in such a manner that less than 5% residual stress is left in the base sheet 101; the elongation to breaking point is greater than 100%; the heat distortion point is higher than 160° F.; and the appearance thereof is clear transparent with a slight brown or white haze therethrough. The thickness of the base sheet 101 may be from a few mils to about 100 mils thick, the preferred thickness being 8 mils, i.e., a thickness of 0.008 inch. This resin provides an opaque milky white embossment when a sheet thereof is embossed utilizing the tool of U.S. Patent No. 3,083,807, it being believed that the transformation from a clear transparent form to an opaque milky white form is a result of a fracture or rupture at the phase or micelle boundaries within the resin generated by stress applied thereto during the embossing operation, at leat the emulsion polymer ingredient responding in this manner, whereby light striking the embossed and stressed portions of the resin is reflected therefrom rather than being transmitted therethrough.

The primer coat 105 is preferably formed from a coating having the following composition:

Table 1

| Ingredient: | Percent by weight |
|---|---|
| Vinyl chloride, vinylidine chloride resin ("Geon 222") | 24.5 |
| Silica flatting agent ("Syloid 308") | 2.5 |
| Ethyl acetate | 49.0 |
| Hexane | 24.0 |
| | 100.0 |

The coating having the composition of Table 1 above is applied to the back surface 103 of the base sheet 101 using a reverse roll coater. This coating step is diagrammatically illustrated in FIG. 5B and designated by the numeral 155, the roll coater being illustrated as the roller 156 which is shown applying a coating 157 of the composition set forth in Table 1 above to the back surface 103 of the base sheet 101, the base sheet 101 moving to the right under the roller 156 with the roller rotating in the direction indicated by the arrow. After the coating 157 has been applied to the base sheet 101, it is dried in an oven (not shown) including three zones, the first zone being at a temperature of 100° F., the second zone being at a temperature of 155° F., and the third zone being at a temperature of 155° F., the coated base sheet 101 being in each of the three zones for about 30 seconds, the residence time in each zone being variable from about 20 seconds to about 40 seconds with satisfactory results. After leaving the oven, the coated sheet is cooled on a water chilled roll, and if it is to be stored before further processing, it is wound with the coated side disposed inwardly. In the process, enough of the coating composition 157 is applied to wet the base sheet 101 to obtain complete coverage thereof, so that after evaporation of the solvent therefrom the primer coat has a thickness on the order of 0.3 mil, as little as 0.2 mil and as much as 0.4 mil being useful.

In place of the resin illustrated in Table 1 above for the primer coat 105, other suitable resins may be used such as acrylic resin, other vinyl resins or nitrocellulose resins. As little as 10% by weight of the composition may constitute the resin and up to as much as 40% by weight of the composition may be resin. Other amounts of the flatting agent may also be utilized, as little as 0.6% by weight or as much as 6.0% by weight of the flatting agent being useful. In addition, other flatting agents may be utilized in place of the silica illustrated, other suitable flatting agents being calcium carbonate, gypsum, barium sulfate, diatomaceous silica, clay, magnesium silicate and aluminum hydrate. The flatting agent also serves to aid in the release of the solvent from the coating 157 during the drying thereof and also serves as an anti-blocking agent when the coated sheet is to be rolled and stored prior to further processing. The ethyl acetate in the formulation of Table 1 serves as a solvent for the resin and may be utilized in lesser or greater amounts, as little as 37% by weight and as much as 73% by weight of ethyl acetate being useful in the composition. The ethyl acetate is a prime solvent for the resin and is preferred because of its limited penetration of the base sheet 101 after application thereto of the coating 157 and prior to the drying thereof. Other suitable prime solvents for use in place of ethyl acetate are methyl ethyl ketone, n-propyl acetate and butyl acetate. The hexane serves as a solvent diluent and serves to lower the viscosity of the coating composition, and since it possesses a lower boiling point, aids in the drying process, carrying out the prime solvent such as the ethyl acetate. The solvent diluent is an optional ingredient, whereby none may be used, and likewise greater quantities may be used such as as much as 37% by weight of the coating composition. Other hydrocarbon solvent diluents may be used in place of the hexane illustrated in Table 1, another example being heptane.

Next the exposed surface of the primer coat 105 has printed thereon the dark portion of the wood design, conventional roll printing or high speed web printing equipment being utilized to apply a vinyl printing ink thereto. This step of the process is diagrammatically illustrated in FIG. 5C, the equipment being generally designated by the numeral 158 and including a printing roll 159 carrying the pattern to be printed on the surface thereof, whereby to provide a printed pattern as at 108 on the exposed surface 107 of the primer coat 105, there being the openings 109 between the printed dark portions 108.

The process of applying the opaque colored layer 110 to the primer coat 105 is illustrated in FIG. 5D. A coating caterial is first provided having the following composition:

Table 2

| Ingredient: | Percent by weight |
|---|---|
| 25% solution of "Elvax 40" in toluene | 32.7 |
| Primrose yellow 325–028–0510 | 14.9 |
| Medium chrome yellow 325–020–0509 | 11.9 |
| Clear nitrocellulose base 325–306–0529 | 7.2 |
| Ethyl acetate | 5.9 |
| Ethyl alcohol | 8.9 |
| Toluene | 14.9 |
| Butyl alcohol | 3.6 |
| | 100.0 |

Up to 0.5% Red 463–006–0681 may be added to adjust the shade of the color of the coating. The coating having the composition of Table 2 above is applied to the back surface 107 of the primer coat 105 and over the printed pattern 108 using a reverse roll coater. This coating step is diagrammatically illustrated in FIG. 5D, the roll coater being designated 160 and being illustrated as including a roller 161 which is shown applying a coating 162 of the composition set forth in Table 2 above to the back surface 107 of the primer coat 105 and over the printed pattern 108, the base sheet 101 moving to the right under the roller 161 with the roller rotating in the direction indicated by the arrow. After the coating 162 has been applied to the primer coat 105, it is dried in an oven (not shown) including three zones, the first zone being at a temperature of 100° F., the second zone being at a temperature of 155° F., and the third zone being at a temperature of 155° F., the coated base sheet 101 being in each of the three zones for about 30 seconds, the residence time in each zone being variable from about 20 seconds to about 40 seconds with satisfactory results. After leaving the oven, the coated sheet is cooled on a water chilled roll, and if it is to be stored before further processing, it is wound with the coated side disposed inwardly. In the process, enough of the coating composition 162 of Table 2 is applied to wet the primer coat 105 so as to obtain complete coverage thereof, and so that after evaporation of the solvent therefrom the layer 110 has a thickness on the order of 0.4 mil, as little as 0.2 mil and as much as 1.0 mil being useful.

The "Elvax 40" resin utilized in the layer 110 is an ethylene acetate-vinyl acetate copolymer sold by Du Pont. Smaller and greater amounts of the resin solution may be utilized, as little as 15% by weight of the formulation being useful and as much as 50% by weight of the formulation also being useful. The ethyl acetate and ethyl alcohol and toluene and butyl alcohol in the formulation of Table 2 serve as the solvent system, the solvent system being chosen to be compatible with the ink forming the printed pattern 108 and with the adhesive layer 121 which is later to be applied to the exposed surface of the opaque colored layer 110.

The pigment dispersions utilized in Table 2 are preferably ones having a yellow cast, and the amount thereof can vary from 5.0% to 30.0% by weight of the coating composition; the following is the composition of a typical pigment dispersion useful in the present invention:

Table 3

| Ingredient: | Percent by weight |
|---|---|
| Nitrocellulose, ½ second viscosity | 25.0 |
| Ethyl alcohol | 30.0 |
| Ethyl acetate | 20.0 |
| Pigment | 25.0 |
| | 100.0 |

In the composition, the ethyl alcohol and the ethyl acetate serve as a solvent system for the nitrocellulose with the pigments suspended therein. Particularly desirable pigments are those sold by California Ink Corporation, the number designations utilized above being those of this company. It will be understood that the proportions among these pigment dispersions may be varied to obtain the desired color and shade for the opaque colored layer 110.

The top coat 115 is preferably formed from a coating having the following composition:

Table 4

| Ingredient: | Percent by weight |
|---|---|
| Methyl methacrylate resin (Rohm and Haas "B–72") | 21.00 |
| Aluminum stearate flattening agent ("Witco #10") | 3.68 |
| 4-tert-butyl phenyl salicyclate ultraviolet screening agent (Dow "TBS") | 1.43 |
| Anti-static agent, stearate compound ("Armour 100V") | 0.17 |
| Wetting agent ("Dyhydag Product LA 19") | 0.04 |
| Toluene | 68.41 |
| Hexane | 5.27 |
| | 100.00 |

The coating having the composition of Table 4 above is applied to the front surface 102 of the base sheet 101 using a reverse roll coater. This coating step is diagrammatically illustrated in FIG. 5E and designated by the numeral 165, the roll coater being illustrated as the roller 166 which is shown applying a coating 167 of the composition set forth in Table 4 above to the front surface 102 of the base sheet 101, the base sheet 101 moving to the right under the roller 166 with the roller 166 rotating in the direction indicated by the arrow. After the coating 167 has been applied to the base sheet 101, it is dried in an oven (not shown) including three zones, the first zone being at a temperature of 100° F., the second zone being at a temperature of 155° F., and the third zone being at a temperature of 155° F., the coated base sheet 101 being in each of the three zones for about 30 seconds, the residence time in each zone being variable from about 20 seconds to about 40 seconds with satisfactory results. After leaving the oven, the coated sheet is cooled on a water chilled roll, and if it is to be stored before further processing, it is wound with the opaque colored layer 110 disposed inwardly. In the process, enough of the coating composition 167 is applied to wet the base sheet 101 to obtain complete coverage thereof, so that after evaporation of the solvent therefrom the top coat 115 has a thickness on the order of 0.3 mil, as little as 0.2 mill and as much as 0.4 mil being useful.

In the coating composition of Table 4 above for the top coat 115, a smaller amount of the acrylic resin may be used, such as, as little as 10% by weight, and more of the acrylic resin may be used, such as for example, as much as 40% by weight. Other amounts of the flatting agent may also be utilized, as little as 1.0% by weight or as much as 10.0% by weight of the flatting agent being useful. In addition, other flatting agents may be used in place of the aluminum stearate illustrated, other suitable flatting agents being calcium carbonate, silica, gypsum, barium sulfate, diatomaceous silica, clay, magnesium silicate and aluminum hydrate. Other amounts of the ultraviolet screening agent may be used, as little as 0.5% and as much as 5.0% by weight of the composition being useful; also, other ultraviolet screening agents may be utilized in lieu of the one illustrated, such as for example, as phenyl salicylate (Dow "Salol"). Any other suitable wetting agent may be utilized and lesser and greater amounts can be utilized, as little as 0.01% by weight and as much as 0.2% by weight being useful. The toluene serves as the principal solvent in this system and fundamentally is a solvent for the acrylic resin; smaller and larger amounts of the toluene may be utilized, as little as 50% by weight and as much as 75% by weight of the coating composition being useful. The hexane in the composition serves as a diluent solvent; the composition is useful even if no hexane is utilized therein and as much as 20% by weight of the coating composition can be hexane. It will be understood that other solvents and solvent systems can be utilized in place of the toluene and hexane illustrated in the coating composition of Table 4, care being taken that the solvent system is a good solvent for the resin utilized and that the solvent has only limited penetration of the base sheet 101 so as to obtain effective release of the solvent from the embossable tape 100 during the processing thereof.

The tape 100 as received from the coating step 165 illustrated in FIG. 5E is useful for embossing purposes, but the utility of the tape is greatly enhanced if the adhesive assembly 120 is added to the back surface 112 of the opaque colored layer 110 thereof. To this end the adhesive layer 121 is applied to the back surface 112 of the opaque colored layer 110 in a coating operation diagrammatically illustrated in FIG. 5F, the adhesive being applied by mechanism generally designated by the numeral 171 and including an applying roller 172, it being understood that any of the other generally useful methods of applying the adhesive layer 121 may be utilized. The adhesive is of the pressure sensitive type and one which is tightly adherent to the back surface 112 of the layer 110.

After application of the adhesive layer 121, the backing sheet 125 is applied over the back surface 123 of the adhesive layer 121, this operation being diagrammatically illustrated in FIG. 5G of the drawings. The backing sheet applying mechanism is generally designated by the numeral 175 and includes a roll 176 of the abcking sheet 125 from which a web is fed downwardly around a pressure applying roller 177 which presses the front surface 126 of the backing sheet 125 against the back surface 123 of the adhesive layer 121, the base sheet 101 moving to the right under the roller 177 as the web of the backing sheet 125 is fed from the roll 176, the roll 176 and the roller 177 rotating in the directions indicated by the arrows respectively associated therewith. After the backing sheet 125 has been applied, the finished embossable tape 100 is preferably wound in a roll or coil with the back surface 127 of the backing sheet 125 disposed inwardly. It will be understood that the material of the backing sheet 125 is preferably a synthetic organic resin and one which has a composition or has the front surface 126 thereof treated in such a manner as to be readily releasable from the adhesive layer 121 without disruption thereof. Further details of a suitable adhesive assembly for use on embossable tape is set forth in U.S. Letters Patent No. 3,036,945 issued May 29, 1962 to David W. Souza, the disclosure of that patent being incorporated herein by reference.

The resultant embossable tape 100 is highly useful for its intended purposes and furthermore it is highly decorative and has a most pleasing appearance. It will be understood that the base sheet 101 and the primer coat 105 and the layer 110 and the top coat 115 are tightly adherent to the adjacent named coats and layers and can be considered to be solvent welded one to the other throughout the thickness of the tape 100. The wood grained pattern 108 is embedded within the tape and therefore cannot be worn off by scuffing or the like, and likewise the opaque colored layer 110 being disposed to the rear of the tape 100 is protected from scuffing and marring, whereby the pleasing wood design is permanent and will not be marred in the normal use of the tape 100. All of the layers named further are readily deformed during the embossing operation as illustarted in FIGS. 2 and 4, the base sheet 101 and the top coat 115 which before embossing were transparent, being rendered opaque and milky white in appearance upon embossment to provide an opaque white embossment on a field of the wood grained design, the resultant embossed tape having a highly pleasing and decorative appearance. The adhesive assembly 120 is likewise deformed to the embossing operation, the backing sheet 125 being readily peelable or detachable from the adhesive layer 121 to permit the embossed tape to be readily adhesively applied to an underlying support surface. The top coat 115 having a matte surface materially enhances the appearance of the wood grained pattern and enhances the illusion of a hand-rubbed wood surface presented by the tape 100. The top coat 115 further has the ultraviolet screening agent therein which protects the tape against deterioration when exposed to sunlight and ultraviolet light, and also has therein the antistatic agent which minimizes the accumulation of a static electrical charge on the tape 100 during the use thereof.

Referring to FIGS. 6 and 8 of the drawings there is illustrated a second embodiment of an embossable sheet material 200 made in accordance with and embodying in the principles of the present invention, the embossable sheet material 200 being in the form of an elongated embossable tape. The construction of the embossable tape 200 is similar to that of the embossable tape 100 described above, and accordingly, where appropriate, like numerals in the 200 series have been applied to parts in FIGS. 6 to 10 that correspond to like parts in FIGS. 1 to 5. As illustrated, the embossable tape 200 includes a base sheet 201 of a synthetic organic resin, the synthetic organic resin being transparent and rigid as distinguished from rubber-like and having a structure and composition such that permanent cold flow deformation thereof to form embossments thereon renders the original transparent resin opaque in the areas of deformation of the embossments. More particularly, the material of the base sheet 201 is the same as that of the base sheet 101 described in detail above and differs therefrom only in that the front surface 202 and the back surface 203 thereof are provided with a matte finish thereon rather than the normal shiny or glossy finish of the surfaces 102 and 103 of the base sheet 101.

Since the back surface 203 of the base sheet 201 has a matte finish, no primer coat is required thereon, and a printed pattern 208 forming a part of a decorative design can be printed directly thereon. As illustrated, the printed pattern 208 is of a dark color and represents the dark portions of a similated wood grained design, the printed pattern 208 having openings 209 therethrough corresponding to the lighter colored portions of the wood grained design. Also applied to the back surface 203 of the base sheet 201 is a layer 210 of synthetic organic resin having a front surface 211 and a back surface 212, the front surface 211 being adhered to the back surface 203 of the base sheet 201. The layer 210 has incorporated therein a relatively light colored pigment such as a yellow or yellow-orange pigment to represent the lighter portions of the wood grained design, and also is preferably opaque so that the printed pattern 208 is clearly seen thereagainst with the colored layer 210 showing through the openings 209 in the printed pattern 208. The printed pattern 208 and the opaque colored layer 210 accordingly cooperate to form a decorative design of the wood grained type visible throughout the area of the base sheet 201 when viewed through the front surface 202 thereof, it being noted that the base sheet 201 is highly transparent.

Since the front surface 202 of the base sheet 201 has a matte finish, the wood grained pattern visible therethrough imparts the illusion of a hand-rubbed wood grained finish, and accordingly, no top coat is required thereon to achieve this effect.

In order to permit the embossable tape 200 to be readily applied to an underlying support surface for the labeling or identification function, an adhesive assembly 220 is provided on the back thereof, and specifically on the back surface 212 of the opaque colored layer 210. More specifically, there is applied to the back surface 212 of the layer 210 a pressure sensitive adhesive layer 221 having a front surface 222 and a back surface 223, the back surface 223 being securely adhered to the back surface 212 of the layer 210. Carried on the back surface 223 of the adhesive layer 221 is a backing sheet 225 including a front surface 226 and a back surface 227, the front surface 226 being detachably adhered to the back surface 223 of the adhesive layer 221, whereby the backing sheet 225 can be readily removed from the adhesive layer 221 without stripping the adhesive layer 221 from the back surface 212 of the layer 210.

The embossable tape 200 is embossed in the same manner as the tape 100 described above. More specifically, an indicia such as the numeral "240" illustrated in the FIG. 7 may be embossed thereon, the resin in the base sheet 201 being rendered opaque in the areas of the embossment as has been explained above with respect to the tape 100. Referring specifically to FIG. 9, the embossment 241 to the left is formed by a cold flow deformation of the base sheet 201 to form a stressed opaque portion 201a flanked by stressed and deformed portions 210b and 210c that rise upwardly out of the unstressed and undeformed base sheet 201. The portions 210a, 201b, and 201c are all opaque and milky white whereby the wood grained design therebeneath is not visible therethrough, whereas the wood grained design beneath the underdeformed portions of the base sheet 201 on either side of the embossment 241 is clearly visible therethrough, whereby the embossment 241 is of an opaque milky white color and is positioned upon a field of wood grained design, thereby to produce a highly pleasing and decorative overall design.

The embossment 244 to the right in FIG. 9 also includes a stress whitened opaque generally horizontally disposed portion 201d of the base sheet 201 and upwardly directed side portions 201e and 201f that are also opaque and extend upwardly out of the unstressed portions of the base sheet 201. The opaque character of the stressed portions 201d and 201e and 201f renders the embossment 244 opaque so that the wood grained pattern disposed therebelow is not visible therethrough, while the wood grained pattern beneath the unstressed base sheet 201 or either side of the embossment 244 is clearly visible therethrough. As a result, the embossment 244 is of an opaque milky white color and is disposed on a field of wood grained design, whereby to provide a highly pleasing and decorative overall design. It will be understood that in the embossments 241 and 244, the other layers of the embossable tape 200 are likewise deformed and corresponding suffixes a through f have been applied to parts which underlie the corresponding lettered parts of the base sheet 201.

There is diagrammatically illustrated in FIGS. 10A through 10E the manner in which the embossable tape 100 is made. Referring to FIG. 10A, there is diagrammatically illustrated the base sheet 201 with the dull rear surface 203 having a matte finish thereon disposed upwardly. The base sheet 201 is preferably formed of the same resin as the base sheet 101 described above. The back surface 203 has printed thereon the dark portion of the wood design, conventional roll printing or high speed web printing equipment being utilized to apply a vinyl printing ink thereto. This step of the process is diagrammatically illustrated in FIG. 10B, the equipment being generally designated by the numeral 258 and including a printing roll 259 carrying the pattern to be printed on the surface thereof, whereby to provide a printed pattern as at 208 on the exposed surface 203 of the base sheet 201, there being the openings 209 between the printed dark portions 208.

The process of applying the opaque colored layer 210 to the printed base sheet 201 is illustrated in FIG. 10C. The coating composition of the layer 210 is identical to that of layer 110 described in detail above. A coating having the composition of Table 2 above is applied to the back surface 203 of the base sheet 201 and over the printed pattern 208 using a reverse roll coater diagrammatically illustrated in FIG. 10C as at 260, the roll coater including a roller 261 which is shown applying a coating 262 of the composition set forth in Table 2 above to the back surface 203 of the base sheet 201 and over the printed pattern 208, the base sheet 201 moving to the right under the roller 261 with the roller rotating in the direction indicated by the arrow. After the coating 262 has been applied to the base sheet 201, it is dried in the same manner as discussed above with respect to the coating 162. In the process, enough of the coating composition 262 is applied to wet the base sheet 201 so as to obtain complete coverage thereof, and so that after evaporation of the solvent therefrom the layer 210 has a thickness on the order of 0.4 mil, as little as 0.2 mil and as much as 1.0 mil being useful.

The adhesive layer 221 is then applied to the back surface 212 of the layer 210, this step being diagrammatically illustrated in FIG. 10D, the adhesive being applied by mechanism generally designated by the numeral 271 and including a roller 272. The base sheet 201 carrying the layer 210 is moved to the right while the roller 272 rotates in the direction illustrated by the arrow, thus to apply the adhesive layer 221 to the layer 210.

As is diagrammatically illustrated in FIG. 10E, the backing sheet 225 is then applied to the exposed back surface 223 of the adhesive layer 221 by mechanism generally designated by the numeral 275 and generally including a roll 276 of the backing sheet 225 and a pressure applying roller 277. The base sheet 201 is moved to the right under the roller 277, the roller 277 pressing the backing sheet 225 against the back surface 223 of the adhesive layer 221, a web of the backing sheet 225 being applied from the roll 276, the roll 276 and the roller 277 rotating in the directions illustrated by the respective arrows associated therewith.

The completed embossable tape 200 has many of the desirable features discussed above with respect to the tape 100, and more particularly, can be readily embossed and applied to an underlying support surface in the same manner as the embossable tape 100.

From the above it will be seen that there have been provided improved embossable sheet materials and specifically embossable tapes which fulfill all of the objects and advantages of the present invention. More particularly, there has been provided an improved embossable tape having a high decorative design of the wood grained type embedded therein and upon which opaque white letters can be formed by hand embossing techniques so as to provide a highly pleasing overall design. In addition the front surface of the tape has applied thereto either a top coat or a matte finish which provides a dull appearance thereof so that the wood grained pattern has a hand-rubbed wood appearance. In one form of the invention an ultraviolet screening agent is provided to protect the tape from deterioration when exposed to sunlight and ultraviolet light and an anti-static agent is provided to reduce the build-up of electrical charges thereon during use thereof. Furthermore, there has been provided on the back surface of the tape a layer of pressure sensitive adhesive and an overlying detachable backing sheet removably adhered to the exposed surface of the adhesive layer, whereby the embossable sheet material after embossing thereof can be adhesively adhered to the underlying support surface after the removal of the backing sheet therefrom.

While there have been described what are at present considered to be certain preferred embodiments of the invention, it will be understood that various modifications may be made therein, and it is intended to cover in the appended claims all such modifications as fall within the true spirit and scope of the invention.

What is claimed is:

1. An embossable sheet material comprising a base sheet having a front surface and a back surface, said base sheet being formed of a transparent rigid synthetic organic resin having a structure and composition such that permanent cold flow deformation thereof to form embossments thereof renders said resin opaque in the areas of deformation of the embossments, an open pattern of a first color on the surface of said base sheet and visible therethrough, and a layer of synthetic organic resin of a second color firmly bonded to the back surface of said base sheet and overlying said open pattern and visible through the openings in said pattern and through said base sheet, said open pattern and said layer cooperating to form a decorative design visible throughout the area of said base sheet when viewed through the front surface thereof, whereby said sheet material is embossable to provide opaque embossments on a field of said decorative design when viewed through the front surface of said base sheet.

2. The embossable sheet material set forth in claim 1, wherein said open pattern of a first color is printed on the back surface of said base sheet and said layer of synthetic organic resin has incorporated therein a color pigment to impart thereto said second color.

3. The embossable sheet material set forth in claim 1 and further comprising a transparent primer coat of synthetic organic resin having a flatting agent uniformly distributed therethrough and firmly bonded to the back surface of said base sheet, said open pattern of a first color being on the back surface of said primer coat and said layer of synthetic organic resin being firmly bonded to the back surface of said primer coat.

4. The embosable sheet material set forth in claim 1, wherein said base sheet has a matte finish on both the back surface thereof and the front surface thereof.

5. An embossable sheet material comprising a base sheet having a front surface and a back surface, said base sheet being formed of a transparent rigid synthetic organic resin having a structure and composition such that permanent cold flow deformation thereof to form embossments thereon renders said resin opaque in the areas of deformation of the embossments, a transparent top coating having a flatting agent uniformly distributed therethrough and firmly bonded to the front surface of said base sheet, a transparent primer coat having a flatting agent uniformly distributed therethrough and firmly bonded to the flat surface of said base sheet, an open pattern of a first color on the back surface of said primer coat and visible through said primer coat and said base sheet and said top coat, and a layer of synthetic organic resin of a second color firmly bonded to the back surface of said primer coat and overlying said open pattern and visible through the openings of said open pattern and through said primer coat and said base sheet and said top coat, said open pattern and said layer cooperating to form a decorative design visible throughout the area of said sheet material when viewed through the exposed surface of said top coat, whereby said sheet material is embossable to provide opaque embossments on the field of said decorative design when viewed through the exposed surface of said top coat.

References Cited

UNITED STATES PATENTS

| | | | |
|---|---|---|---|
| 2,630,395 | 3/1953 | McCullough et al. | 161—261 |
| 3,264,164 | 8/1966 | Jetothe et al. | 161—116 |
| 3,025,180 | 3/1962 | Dalton | 117—36.7 |
| 3,078,176 | 2/1963 | McBride | 117—10 |
| 3,312,563 | 4/1967 | Rusch | 161—406 |
| 3,309,257 | 3/1967 | Borack | 161—406 |

ROBERT F. BRUNETT, Primary Examiner

R. J. ROCHE, Assistant Examiner

U.S. Cl. X.R.

40—2; 117—76, 122; 161—120, 406, 413

UNITED STATES PATENT OFFICE
CERTIFICATE OF CORRECTION

Patent No. 3,542,630      Dated November 24, 1970

Inventor(s) R. H. Pfiffner

It is certified that error appears in the above-identified patent and that said Letters Patent are hereby corrected as shown below:

Col. 1, line 29, "type" should be -- tape --.
Col. 5, line 59, "leat" should be -- least --.
Col. 7, line 1, before "primer" insert -- printed --.
Col. 7, line 2, "caterial" should be -- material --.
Col. 8, line 13, "flattening" should be -- flatting --.
Col. 11, line 22, "210a" should be -- 201a --.

Col. 13, line 6, -- back -- should be before "surface"
Col. 9, line 33, "abcking" should be -- backing --.

Signed and sealed this 13th day of April 1971.

(SEAL)
Attest:

EDWARD M. FLETCHER, JR.      WILLIAM E. SCHUYLER, JR
Attesting Officer      Commissioner of Patents